2,942,025
PROCESS FOR PRODUCING CARBODIIMIDES

Robert F. Coles, North St. Paul, Minn., and Harold A. Levine, Vestal, N.Y., assignors to General Aniline & Film Corporation, New York, N.Y., a corporation of Delaware No Drawing. Filed May 19, 1958, Ser. No. 735,991

7 Claims. (Cl. 260—551)

This invention relates to carbodiimides and a process for preparing them.

Carbodiimides are known chemical compounds and are useful intermediates in the chemical field and related arts. Carbodiimides have been found particularly valuable in the realm of photography where they are used to prepare modified gelatins and in this connection reference is made to our co-pending application Serial Number 609,529, filed September 13, 1956, now abandoned.

The chemical literature contains relatively few references on carbodiimides and their preparation. A general method of preparing these compounds comprises treating N,N'-disubstituted thioureas with heavy metal oxides or carbonates such as mercuric oxide (HgO), lead oxide (PbO), lead carbonate (PbCO$_3$), and the like. The removal of the sulfur or desulfurization of the thioureas appears to be a surface phenomenon occurring at the reactive surface. A serious limitation to the above reaction arises from the fact that the heavy metal compounds lose their activity before complete desulfurization of the thioureas is complete. This deactivation is caused by the deposition of a metal sulfide, which is a product of the reaction, as a coating over the heavy metal compounds which greatly retards their effectiveness as desulfurizing agents. Although large excesses of the heavy metal oxide or carbonates can be used, results are not always satisfactory and consistent and besides, such an approach is uneconomical. Moreover, it is difficult to obtain metallic oxides which are consistently uniform in their reaction with the N,N'-disubstituted thioureas.

It has now been discovered that carbodiimides can be produced in a manner free of the drawbacks and encumbrances of the prior art, and a provision of such a process constitutes the aims and purposes of the present invention.

According to the process of this invention, N,N'-disubstituted carbodiimides can be prepared by reacting a N,N'-disubstituted thiourea of the following general formula:

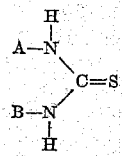

wherein A and B, which may be alike or different, represent organic radicals such as an aliphatic radical, i.e., alkyl, e.g., methyl, ethyl, propyl, isopropyl, n-butyl, isobutyl, tert.-butyl, allyl, crotyl, β-hydroxyethyl, γ-dimethylaminopropyl, β-bromoallyl, and the like; an alicyclic radical, e.g., cyclopropyl, cyclobutyl, cyclopentyl, cyclohexyl, cycloheptyl, cyclooctyl, cylononyl, cyclodecyl, and the like; an aromatic radical, e.g., phenyl, tolyl, xylyl, naphthyl, p-dimethylaminophenyl and its quaternary ammonium salts, chlorophenyl, bromophenyl, iodophenyl, and the like; and a heterocyclic radical, e.g., pyridyl, quinolyl, and the like; with a lower alkyl chloroformic ester.

The resulting carbodiimides so obtained correspond to the following general formula:

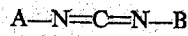

wherein A and B have the values given above.

The representative carbodiimides falling within the ambit of the above formula are the following:

N-methyl-N'-tert.-butylcarbodiimide
N,N'-di-isopropylcarbodiimide
N,N'-dicyclohexylcarbodiimide
N,N'-ditert.-butylcarbodiimide
N-cyclohexyl-N'-tert.-butylcarbodiimide
N,N'-dibutylcarbodiimide
N-allyl-N'-propylcarbodiimide
N,N'-diallylcarbodiimide
N-allyl-N'-cyclohexylcarbodiimide
N-crotyl-N'-cyclohexylcarbodiimide
N-allyl-N'-(β-hydroxyethyl)carbodiimide
N-methyl-N'-propylcarbodiimide
N-propyl-N'-tert.-butylcarbodiimide
N-isopropyl-N'-tert.-butylcarbodiimide
N-(γ-dimethylaminopropyl)-N'-tert.-butylcarbodiimide
N-(β-bromoallyl)-N'-propylcarbodiimide
N-(β-bromoallyl)N'-isopropylcarbodiimide
N-(β-bromoallyl)N'-tert.-butylcarbodiimide
N-(γ-dimethylaminopropyl)-N'-(β-bromoallyl)carbodiimide
N,N-diphenylcarbodiimide
N,N'-di(p-tolyl)carbodiimide
N,N'-di(4-bromophenyl)carbodiimide
N,N'-di(4-iodophenyl)carbodiimide
N,N'-dinaphthyl(2)carbodiimide
N,N'-di(p-dimethylaminophenyl)carbodiimide
N,N'-di(α-pyridyl)carbodiimide
N-cyclohexyl-N'-(p-tolyl)carbodiimide
N,N'-di-isobutylcarbodiimide
N-isopropyl-N'-(p-tolyl)carbodiimide
N-isopropyl-N'-(p-dimethylaminophenyl)carbodiimide
N-phenyl-N'-(p-dimethylaminophenyl)carbodiimide
N,N'-di(4-dimethylaminophenyl)carbodiimide
N,N'-di(4-dimethylaminophenyl)carbodiimide monoethiodide
N,N'-di(4-dimethylaminophenyl)carbodiimide dimethiodide
N,N'-di(4-dimethylaminophenyl)carbodiimide monomethosulfate
N,N'-di(4-dimethylaminophenyl)carbodiimide dimethosulfate
N,N'-di(4-dimethylaminophenyl)carbodiimide ethyl p-toluene sulfonate The reaction is effected by suspending or dissolving the N,N'-disubstituted thiourea in an inert liquid medium in the presence of an acid-binding agent. As shown in the following equation, the hydrohalic acid is eliminated between the thiourea and haloformic ester giving rise to the hydrohalide salt and an intermediate condensation product which is subsequently decomposed to yield the carbodiimide, an alcohol and carbon oxysulfide.

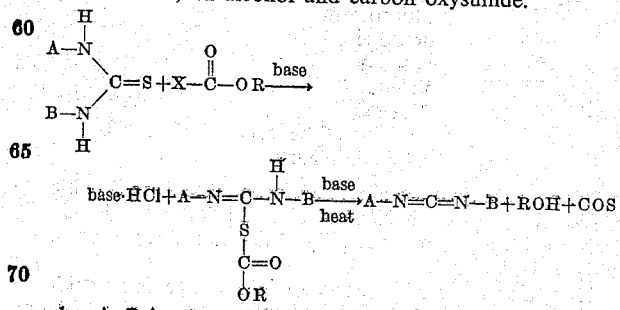

wherein R is a lower alkyl group.

The reaction is preferably carried out by adding the alkyl haloformic ester to a cooled solution or suspension of the appropriate N,N'-disubstituted thiourea in the presence of an acid-binding agent in a suitable medium. The carbodiimide may be isolated from the reaction mixture by such well-known chemical techniques as distillation or crystallization. Thus, with the lower molecular weight members, purification is best effected by distillation. In the case of the higher members, however, distillation might result in excessive polymerization and decomposition of the carbodiimides in which case the product is best isolated and purified by crystallization.

Our new process of producing carbodiimides is of general applicability and appears to be limited only by the number of N,N'-disubstituted thioureas that are available.

In the following list are typified N,N'-disubstituted thioureas which may be employed for the purpose herein set forth:

N-methyl-N'-tert.-butylthiourea
N,N'-di-isopropylthiourea
N,N'-dicyclohexylthiourea
N,N'-ditert.-butylthiourea
N-cyclohexyl-N'-tert-butylthiourea
N,N'-dibutylthiourea
N,N'-di-isobutylthiourea
N-allyl-N'-propylthiourea
N,N'-diallylthiourea
N-allyl-N'-cyclohexylthiourea
N-crotyl-N'-cyclohexylthiourea
N-allyl-N'-($\beta$-hydroxyethyl)thiourea
N-methyl-N'-propylthiourea
N-propyl-N'-tert.-butylthiourea
N-isopropyl-N'-tert.-butylthiourea
N-($\gamma$-dimethylaminopropyl)-N'-tert.-butylthiourea
N-($\beta$-bromoallyl)-N'-propylthiourea
N-($\beta$-bromoallyl)-N'-isopropylthiourea
N-($\beta$-bromoallyl)-N'-tert.-butylthiourea
N-($\gamma$-dimethylaminopropyl)-N'-($\beta$-bromoallyl)thiourea
N,N'-diphenylthiourea
N,N'-di(p-tolyl)thiourea
N,N'-di(4-bromophenyl)thiourea
N,N'-di(4-iodophenyl)thiourea
N,N'-dinaphthyl(2)thiourea
N,N'-di(p-dimethylaminophenyl)thiourea
N,N'-di($\alpha$-pyridyl)thiourea
N-cyclohexyl-N'-(p-tolyl)thiourea
N-isopropyl-N'-(p-tolyl)thiourea
N-isopropyl-N'-(p-dimethylaminophenyl)thiourea
N-phenyl-N'-(p-dimethylaminophenyl)thiourea
N,N'-di(4-dimethylaminophenyl)thiourea
N,N'-di(4-dimethylaminophenyl)thiourea monoethiodide
N,N'-di(4-dimethylaminophenyl)thiourea dimethiodide
N,N'-di(4-dimethylaminophenyl)thiourea monomethosulfate
N,N'-di(4-dimethylaminophenyl)thiourea dimethosulfate
N,N'-di(4-dimethylaminophenyl)thiourea ethyl p-toluene sulfonate The reaction may be carried out in inert liquid solvents or mediums such as aromatic hydrocarbons, halogenated aromatic and aliphatic hydrocarbons, aliphatic ethers, cyclic ethers, and the like. Typical solvents are the following:

Chloroform
Benzene
Toluene
Xylene
Dioxane
Chlorinated benzene
Aliphatic ethers

Although any of the alkyl haloformic esters are capable of reacting with the N,N'-disubstituted thioureas as herein described, we prefer the readily available and inexpensive ethyl chloroformate.

Examples of suitable basic condensing agents or acid-binding agents include trialkylamines, e.g., trimethylamine, triethylamine, tri-n-propylamine, tri-n-butylamine, diethylmethylamine, ethyldimethylamine, and the like; various heterocyclic tertiary amines such as quinoline, pyridine, isoquinoline, dialkylanilines, e.g., N,N'-dimethylaniline, and the like; and alkali metal carbonates such as potassium or sodium carbonate.

The invention is illustrated in greater detail by the following specific examples but it is to be understood that such examples are given by way of illustration only and are not to be taken as limiting the invention.

EXAMPLE I

*N,N'-dicyclohexylcarbodiimide*

In a 500 ml. 3-necked flask, equipped with a reflux condenser, stirrer, dropping funnel and thermometer, was placed N,N'-dicyclohexylthiourea (21.6 g., 0.1 mole) and chloroform (200 ml.). The mixture was heated to dissolve and then cooled in Dry Ice plus acetone to —5 to —10° C. Triethylamine (10.1 g., 0.1 mole) was added and then ethyl chloroformate (12.1 g., 0.1 mole) was added dropwise with stirring. The solid dissolved. The solution was concentrated by distillation at reduced pressure and the residual oil plus solid treated with 100 ml. of 12% potassium hydroxide. The organic layer was separated, dissolved in 100 ml. of benzene and filtered. The benzene solution was dried over anhydrous sodium sulfate and fractionally distilled at reduced pressure. A major fraction, 8.3 g. boiling at 153–158° C./12 mm., was collected. Literature B.P. 154° C./12 mm.

A sample of the product was treated with acetic acid in water to give a white crystalline solid. Recrystallization from absolute alcohol gave a product M.P. 231–232° C.

An authentic sample of N,N'-dicyclohexylcarbodiimide treated in the same manner yielded a product M.P. 231–232° C. and gave no appreciable lowering in a mixed melting point determination—230–231° C.

Therefore, desulfurization had occurred and the desired product was obtained, as shown by the identical melting point of the aforesaid N,N'-dicyclohexyl urea derivatives.

EXAMPLE II

*Diisopropylcarbodiimide*

A solution of 80 g. of diisopropylthiourea (0.50 mole) in 400 ml. of dry chloroform was stirred in a 3-necked round bottom flask cooled by an external ice bath. An equimolar amount of ethyl chlorocarbonate (61 g.) was added dropwise during one-half hour. One-half mole of triethylamine (51 g.) was then slowly added. The reaction mixture was stirred for 1 hour at room temperature. The chloroform was distilled off at reduced pressure. The white residue was extracted with 400 ml. of dry benzene. The benzene extract was evaporated at reduced pressure to yield a residual oil. This residue was heated with 51 g. of triethylamine. Carbon oxysulfide was evolved in copious quantities. After gas evolution had ceased, the residue was fractionally distilled at 40 mm. pressure. A major fraction (29 g.) boiling at 60–75° C. at 40 mm. was collected. Refractionation gave diisopropylcarbodiimide, B.P. 62.5–65° C. at 40 mm. The diisopropyl urea was prepared by dissolving the product in acetone and treating with acetic acid. After recrystallization from absolute ethanol, this had a melting point of 191–192° C. Authentic diisopropyl urea had a melting point of 189–190° C. Mixed melting point 191–192° C.

We claim:

1. A process of producing a carbodiimide of the following general formula:

$$A-N=C=N-B$$

wherein A and B are selected from the class consisting of lower alkyl, cycloalkyl and phenyl which comprises reacting about 1 mole of a N,N'-disubstituted thiourea of the following general formula:

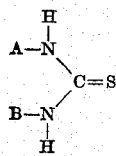

wherein A and B are selected from the class consisting of lower alkyl, cycloalkyl and phenyl with lower alkyl haloformic ester in an inert liquid solvent in the present of an acid binding agent to form an intermediate product and heating said intermediate product to form a carbodiimide and isolating said carbodiimide from the reaction mixture by distillation.

2. A process as recited in claim 1 wherein the inert liquid solvent is an aliphatic hydrocarbon.

3. A process as defined in claim 1 wherein the haloformic ester is ethyl chloroformate.

4. A process as defined in claim 1 wherein the N,N'-disubstituted thiourea is N,N'-dicyclohexylthiourea.

5. A process as defined in claim 1 wherein the acid-binding agent is a trialkylamine.

6. A process as defined in claim 5 wherein the acid-binding agent is triethylamine.

7. A process as defined in claim 2 wherein the inert liquid solvent is chloroform.

References Cited in the file of this patent

UNITED STATES PATENTS

| | | |
|---|---|---|
| 2,415,043 | Rust | Jan. 28, 1947 |
| 2,656,383 | Schmidt et al. | Oct. 20, 1953 |

FOREIGN PATENTS

| | | |
|---|---|---|
| 708,678 | Germany | July 29, 1941 |
| 924,751 | Germany | Mar. 7, 1955 |